US008513560B2

(12) United States Patent
Takahashi et al.

(10) Patent No.: US 8,513,560 B2

(45) Date of Patent: *Aug. 20, 2013

(54) SPOT WELDING SYSTEM

(75) Inventors: Hiromitsu Takahashi, Yamanashi (JP); Masanobu Hatada, Yamanashi (JP); Toshimichi Aoki, Yamanashi (JP); Akinori Nishimura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 211 days.

This patent is subject to a terminal disclaimer.

(21) Appl. No.: 12/944,386

(22) Filed: Nov. 11, 2010

(65) Prior Publication Data

US 2011/0120978 A1 May 26, 2011

(30) Foreign Application Priority Data

Nov. 26, 2009 (JP) ................................ 2009-268888

(51) Int. Cl.
*B23K 11/11* (2006.01)

(52) U.S. Cl.
USPC ......................... 219/86.25; 700/245; 700/264

(58) Field of Classification Search
USPC .......... 219/86.23, 86.25, 86.33, 86.41, 86.51, 219/86.61, 86.7, 87, 91.2, 91.9, 109, 110, 219/117; 228/102; 318/568, 568.12, 568.18, 318/569.19; 702/85, 94, 105; 700/245, 246, 700/247, 249, 253, 260; 901/1
See application file for complete search history.

(56) References Cited

U.S. PATENT DOCUMENTS

| | | | | |
|---|---|---|---|---|
| 5,412,172 | A * | 5/1995 | Ichikawa et al. | 219/86.41 |
| 6,232,572 | B1 * | 5/2001 | Kanjo | 219/110 |
| 2004/0186627 | A1 * | 9/2004 | Watanabe et al. | 700/264 |
| 2008/0308533 | A1 * | 12/2008 | Takahashi et al. | 219/117.1 |

FOREIGN PATENT DOCUMENTS

| | | | |
|---|---|---|---|
| JP | 11-104849 | A | 4/1999 |
| JP | 2004-358508 | * | 12/2004 |
| JP | 2004-358508 | A | 12/2004 |
| JP | 2008-132525 | A | 6/2008 |

OTHER PUBLICATIONS

Japanese Office Action 2009-268888 issued Aug. 23, 2011.

* cited by examiner

*Primary Examiner* — Henry Yuen
*Assistant Examiner* — Thien S Tran
(74) *Attorney, Agent, or Firm* — Lowe, Hauptman & Ham

(57) ABSTRACT

A spot welding system including a spot welding gun having a pair of electrodes disposed opposite to each other, and a servo motor for allowing the pair of electrodes to approach each other and separate from each other; a robot for movably holding either a spot welding gun or a workpiece so that a workpiece is disposed between the pair of electrodes of the spot welding gun; a physical quantity detection section for detecting a physical quantity correlative to torque or velocity of the servo motor; a position detection section for detecting positions of the pair of electrodes; a mode switching section for switching, by a switching command, an operation mode of the spot welding system between a spot welding mode for spot-welding the workpiece and a position correction mode for correcting a spot welding position of the workpiece; and a processing section for performing a spot welding process in the spot welding mode and a position correction process in the position correction mode.

12 Claims, 13 Drawing Sheets

```
1:STRAIGHT LINE POSITION[1] 2000mm/s POSITIONING
2:STRAIGHT LINE POSITION[2] 2000mm/s SMOOTH 100 SPOT[SD=1,P=1,S=1,ED=1]
3:STRAIGHT LINE POSITION[3] 2000mm/s POSITIONING
```

Fig.2B

```
1:STRAIGHT LINE POSITION[1] 2000mm/s POSITIONING
2:STRAIGHT LINE POSITION[2] 2000mm/s SMOOTH 100 SPOT[SD=1,P=1,S=1,ED=1]
3:STRAIGHT LINE POSITION[3] 2000mm/s POSITIONING
4:STRAIGHT LINE POSITION[4] 2000mm/s SMOOTH 100 SPOT[SD=1,P=1,S=1,ED=1]
5:STRAIGHT LINE POSITION[5] 2000mm/s POSITIONING
                          ⋮
```

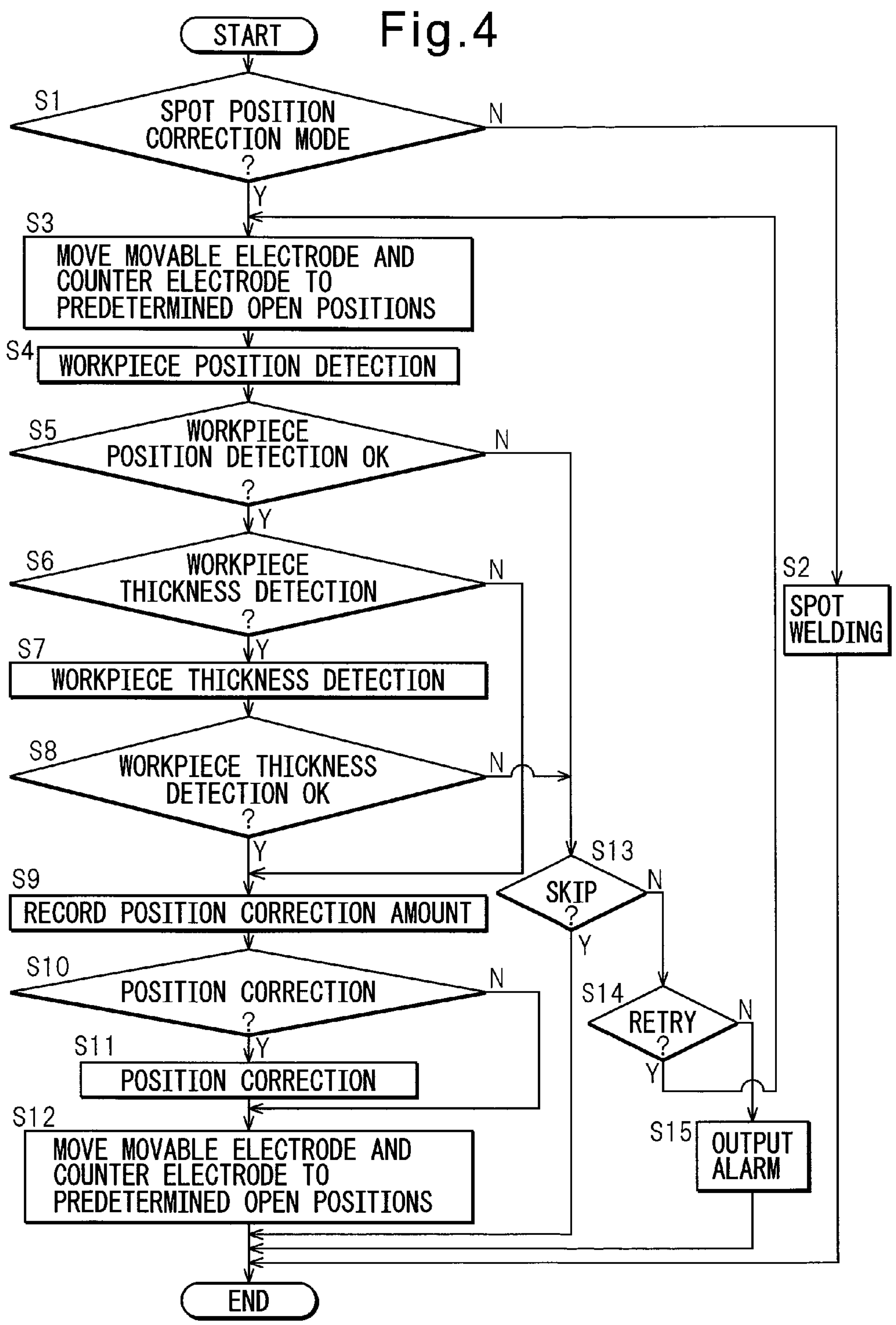
Fig.4
START
S1
SPOT POSITION CORRECTION MODE ?
N
Y
S2
SPOT WELDING
S3
MOVE MOVABLE ELECTRODE AND COUNTER ELECTRODE TO PREDETERMINED OPEN POSITIONS
S4
WORKPIECE POSITION DETECTION
S5
WORKPIECE POSITION DETECTION OK ?
S6
WORKPIECE THICKNESS DETECTION ?
S7
WORKPIECE THICKNESS DETECTION
S8
WORKPIECE THICKNESS DETECTION OK ?
S9
RECORD POSITION CORRECTION AMOUNT
S10
POSITION CORRECTION ?
S11
POSITION CORRECTION
S12
MOVE MOVABLE ELECTRODE AND COUNTER ELECTRODE TO PREDETERMINED OPEN POSITIONS
S13
SKIP ?
S14
RETRY ?
S15
OUTPUT ALARM
END

Fig.12A

```
1:STRAIGHT LINE POSITION[1] 2000mm/s POSITIONING
2:STRAIGHT LINE POSITION[2] 2000mm/s SMOOTH 100 SPOT[SD=1, P=1, S=1, ED=1]
3:STRAIGHT LINE POSITION[3] 2000mm/s POSITIONING
4:STRAIGHT LINE POSITION[4] 2000mm/s SMOOTH 100 SPOT[SD=1, P=1, S=1, ED=1] POSITION CORRECTION DISABLED
5:STRAIGHT LINE POSITION[5] 2000mm/s POSITIONING
```

Fig.12B

```
1:STRAIGHT LINE POSITION[1] 2000mm/s POSITIONING
2:STRAIGHT LINE POSITION[2] 2000mm/s SMOOTH 100 SPOT[SD=1, P=1, S=1, ED=1]
3:STRAIGHT LINE POSITION[3] 2000mm/s POSITIONING
4:STRAIGHT LINE POSITION[4] 2000mm/s SMOOTH 100 SPOT[SD=1, P=1, S=1, ED=1] POSITION CORRECTION
5:STRAIGHT LINE POSITION[5] 2000mm/s POSITIONING
```

START
S21
SPOT POSITION CORRECTION MODE ?
N
Y
S23
SPOT WELDING ?
N
Y
S24
SPOT WELDING
S25
WELDING RESULT NG ?
N
Y
S26
POSITION CORRECTION SEQUENCE
S27
SPOT WELDING ?
N
Y
S28
SPOT WELDING
S29
WELDING RESULT OK ?
N
Y
S22
SPOT WELDING
END

SPOT WELDING SYSTEM

RELATED APPLICATIONS

The present application is based on, and claims priority from, Japanese Application Number 2009-268888, filed Nov. 26, 2009, the disclosure of which is hereby incorporated by reference herein in its entirety.

BACKGROUND OF THE INVENTION

1. Field of the Invention

The present invention relates to a spot welding system for spot-welding a workpiece automatically by using a robot.

2. Description of the Related Art

When a workpiece is spot-welded automatically by using a robot, if a workpiece position recorded in a working program deviates from an actual workpiece position, problems such that an overload is applied to the workpiece and welding current does not properly flow may occur, which results in degradation of welding quality. Consequently, in the conventional art, the workpiece position is checked before spot-welding, and if the workpiece position is deviated, the workpiece position stored in the working program is corrected.

In a system described in Japanese Unexamined Patent Publication (kokai) No. 2008-132525 (JP2008-132525A), in place of a movable electrode, an imaging device is attached to a spot welding gun, so that the imaging device captures an image of the workpiece, and then a distance from the imaging device to the workpiece is computed. Then, based on the workpiece position information, the imaging distance and the like, the position correction is performed.

However, in the system described in JP2008-132525A, because complicated operations such as attachment and detachment of the imaging device, are required every time the position correction is carried out, the position correction cannot be quickly carried out.

SUMMARY OF THE INVENTION

One aspect of the present invention provides a spot welding system including a spot welding gun having a pair of electrodes disposed oppositely to each other, and a servo motor for allowing the pair of electrodes to approach each other and separate from each other; a robot for holding either one of the spot welding gun and a workpiece in a manner movable relative to each other another so that the workpiece is disposed between the pair of electrodes of the spot welding gun; a physical quantity detection section for detecting a physical quantity correlative to torque or velocity of the servo motor; a position detection section for detecting positions of the pair of electrodes; a mode switching section for switching, by a switching command, an operation mode of the spot welding system between a spot welding mode for spot-welding the workpiece and a position correction mode for correcting a spot welding position of the workpiece; and a processing section for performing a spot welding process in the spot welding mode and a position correction process in the position correction mode. The processing section has a spot welding gun and robot control section for controlling the spot welding gun and the robot so that, when the operation mode is switched into the spot welding mode by the mode switching section, the workpiece is spot-welded based on a workpiece position set in a predetermined working program and, when the operation mode is switched into the position correction mode, one of the pair of electrodes abuts against a surface of the workpiece; an abutment determination section for determining whether one of the pair of electrodes abuts against the surface of the workpiece or not based on a value detected by the physical quantity detection section in the position correction mode; and a computation section for computing the workpiece position based on a value detected by the position detection section when the abutment determination section determines that one of the pair of electrodes abuts against the surface of the workpiece.

BRIEF DESCRIPTION OF THE DRAWINGS

The object, features and advantages of the present invention will become more apparent from the following description of embodiments taken in conjunction with the accompanying drawings, in which:

FIG. 2A is a diagram illustrating an example of a working program for spot-welding;

FIG. 2B is a diagram illustrating another example of a working program for spot-welding:

FIG. 4 is a flowchart illustrating an example of a process performed in a robot controller and a welding gun controller according to the first embodiment of the present invention;

FIG. 12A is a diagram illustrating an example of a working program in the workpiece thickness detection process;

FIG. 12B is a diagram illustrating another example of a working program in the workpiece thickness detection process;

DETAILED DESCRIPTION

A First Embodiment

Figure 1:
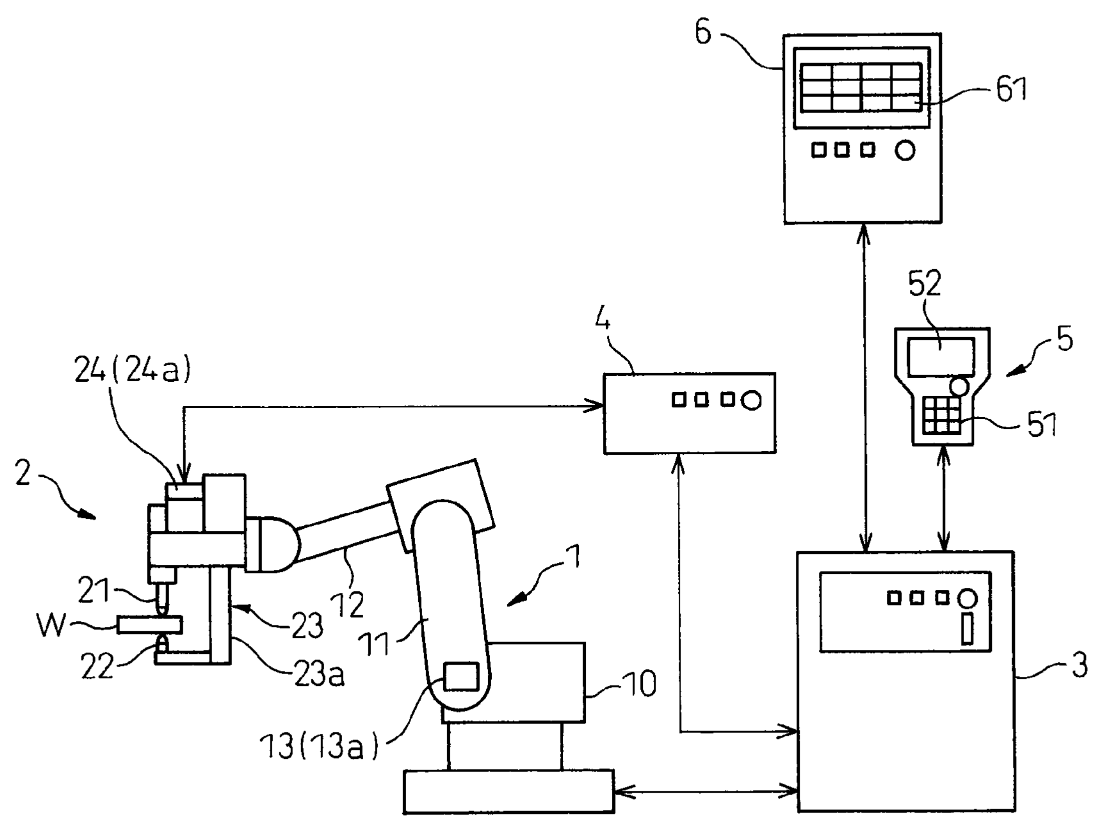
FIG. 1 is a diagram schematically illustrating an overall configuration of a spot welding system according to a first embodiment of the present invention.

Hereinafter, referring to FIGS. 1 to 12B, a spot welding system according to a first embodiment of the present invention will be described. FIG. 1 is a diagram schematically illustrating an overall configuration of a spot welding system according to a first embodiment of the present invention. This spot welding system comprises an articulated robot 1, a spot welding gun 2, a robot controller 3 for controlling robot 1, and a welding gun controller 4 for controlling spot welding gun 2.

Robot 1 is a common 6-*axis* vertical articulated robot that has a base 10 secured to a floor; a lower arm 11 rotatably coupled to base 10; an upper arm 12 rotatably coupled to a tip of lower arm 11; and spot welding gun 2 rotatably attached to a tip of upper arm 12. Robot 1 has a plurality of servo motors 13 (only one is illustrated for convenience) for driving the robot. Servo motors 13 are driven by control signals from robot controller 3, so that a position and orientation of spot welding gun 2 is changed.

Spot welding gun 2 is a so-called C-type spot welding gun that has a U-shaped gun arm 23 rotatably coupled to the tip of upper arm 12 and a servo motor 24 for holding a workpiece. Gun arm 23 has a bar-like counter electrode 22 projecting from an end of an L-shaped frame 23*a* and a bar-like movable electrode 21 projecting oppositely to counter electrode 22. Movable electrode 21 and counter electrode 22 are disposed coaxially to each other. While counter electrode 22 is secured to frame 23*a*, movable electrode 21 can move coaxially to counter electrode 22 with respect to frame 23*a*.

Servo motor 24 is driven by control signals from welding gun controller 4, so that movable electrode 21 approaches counter electrode 22 and separates from counter electrode 22. Workpiece W is held between movable electrode 21 and counter electrode 22 in a thickness direction of workpiece W and workpiece W is spot-welded. Workpiece W is supported by a workpiece supporting device that is not illustrated.

Each servo motor 13 for driving the robot is provided with an encoder 13*a* that detects an axial rotation angle of servo motor 13. The detected rotation angle is fed back to robot controller 3. The position and orientation of spot welding gun 2 at the tip of the arm are controlled by the feedback control in Robot controller 3. As a result, counter electrode 22 integral to frame 23*a* can be positioned at a taught position in the thickness direction of workpiece W and the position, and orientation of counter electrode 22 can be detected based on the signals from encoders 13*a*.

Similarly, servo motor 24 for holding the workpiece is provided with an encoder 24*a* that detects an axial rotation angle of servo motor 24. The detected rotation angle is fed back to welding gun controller 4. Movable electrode 21 can be positioned with respect to counter electrode 22 by the feedback control in welding gun controller 4. A distance between electrodes 21 and 22 varies according to the rotation angle of servo motor 24. In this embodiment, the rotation angle of servo motor 24 when movable electrode 21 is in contact with counter electrode 22 or, in other words, when the distance is zero is defined as a reference value in advance. Consequently, based on the signals from encoder 24*a*, the rotation angle from the reference value and, i.e., the distance between electrodes 21 and 22 can be detected.

Each of robot controller 3 and welding gun controller 4 includes a processor having a CPU, a ROM, a RAM and other peripheral circuits. Robot controller 3 is connected to welding gun controller 4. Robot controller 3 and welding gun controller 4 communicate with each other to transmit the signals therebetween. Robot controller 3 is further connected to a teaching control panel 5 and a line control panel 6.

In the memory of robot controller 3, operation programs (working programs), teaching data and the like of robot 1 and spot welding gun 2 are stored in rewritable forms. The teaching data includes welding point data that represents the positions and orientations of robot 1 and spot welding gun 2 when workpiece W is spot-welded at a plurality of welding positions. Based on this teaching data, the working programs for automatic operation are created.

During the automatic operation, robot controller 3 operates robot 1 according to the working programs, so as to control the position and orientation of spot welding gun 2 with respect to workpiece W to dispose workpiece W between electrodes 21 and 22. On the other hand, welding gun controller 4 operates movable electrode 21 according to the working programs, so as to control welding pressure applied to workpiece W by electrodes 21 and 22 and control current supplied to electrodes 21 and 22 to perform the spot welding at a predetermined welding point position.

Teaching control panel 5 has a manipulating section 51 manipulated by an operator and a display section 52 for notifying predetermined information to the operator. From manipulating section 51, teaching commands for the operations of robot 1, commands for editing or executing the working programs and the like are mainly input. Display section 52 indicates various information about setting, operation, abnormality and the like of robot 1.

Though not illustrated in the figures, in a manufacturing line in a factory, a plurality of the spot welding systems according to this embodiment are provided and a line control panel 6 is connected to each robot controller 3 of these systems. The signals from each robot controller 3 and their respective peripheral devices are sent to line control panel 6 and, based on these signals, line control panel 6 can manage the spot welding manufacturing line in a unified way. Through display section 61 provided in line control panel 6 or a display device (not illustrated) connected to line control panel 6, the operating conditions of each robot 1 can be grasped.

Line control panel 6 receives the signals from each robot controller 3 and outputs external signals to each robot controller 3. In particular, in this embodiment, as described below, a mode switching command for selecting either one of a spot position correction mode for correcting the spot welding point position and a spot welding mode for performing the spot welding at the spot welding point position, a workpiece thickness detection command for detecting a workpiece thickness in the spot position correction mode, a position correction command for correcting the welding point position based on the detected workpiece position and workpiece thickness, a skip command for skipping the process in the spot position correction mode when an abnormal condition is detected in the spot position correction mode, a retry mode for retrying the process in the spot position correction mode when an abnormal condition is detected in the spot position correction mode, and the like are output from line control panel 6 to each robot controller 3. An activation command for executing the working programs may be output from line control panel 6 to each robot controller 3. The external signals may be output from line control panel 6 via various communication means such as Ethernet communication. These commands may be issued by operation of teaching control panel 5.

Figure 3:
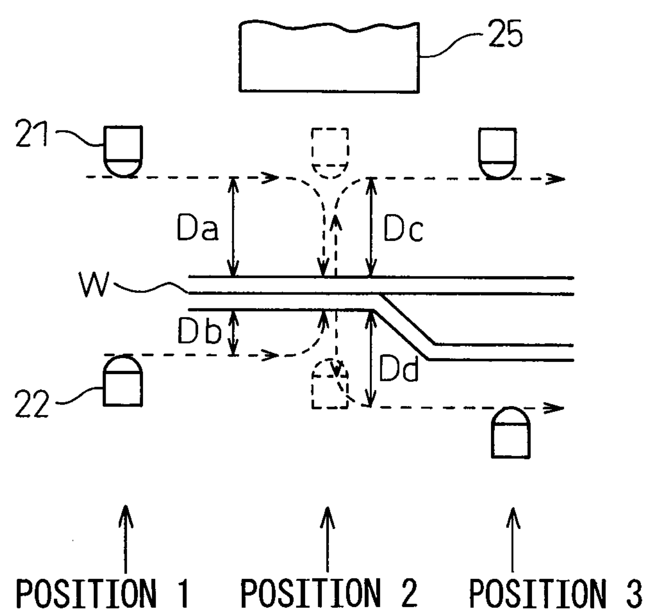
FIG. 3 is a diagram illustrating operations of a movable electrode and a counter electrode due to execution of the working programs of FIG. 2A.

FIGS. 2A and 2B are diagrams illustrating examples of the working programs. FIG. 2A illustrates a program when there is only one welding point, and FIG. 2B illustrates a program when there are a plurality of welding points. FIG. 3 is a diagram illustrating operations of electrodes 21 and 22 by executing these working programs. In the figure, while workpiece W is held horizontally, electrodes 21 and 22 are moved to perform the spot welding. More specifically, a pair of electrodes 21 and 22 are disposed above and below workpiece W, respectively, and vertically with respect to workpiece W and, then, electrodes 21 and 22 are moved to the welding point positions above and below the workpiece to perform the spot welding.

If the welding point position on one of top and bottom surfaces of the workpiece is changed due to the thickness of workpiece W, it overlaps the welding point position on the other of the top and bottom surface of the workpiece. Consequently, in the programs, only either one of the top and bottom surfaces (for example, the bottom surface) of the workpiece is set along with the thickness of the workpiece.

A first line in FIG. 2A represents a program instruction instructing electrodes 21 and 22 to move to waiting positions before starting the spot welding. In response to this program instruction, electrodes 21 and 22 move to positions 1 in FIG. 3 that are separated from the respective workpiece surfaces by predetermined distances Da and Db, respectively, at a predetermined velocity (2000 mm/s) and temporarily stop there.

A second line in FIG. 2A represents a program instruction instructing electrodes 21 and 22 to move to the welding point positions and perform the spot welding at these positions. In response to this program instruction, electrodes 21 and 22 move to the welding point positions along routes illustrated in FIG. 3 at a predetermined velocity (2000 mm/s) and, then, apply the pressing forces to workpiece W. In this state, electrodes 21 and 22 are energized.

In the programs, SD=1 is an open position condition representing the distance between electrodes 21 and 22 before the spot welding. P=1 is a pressing condition representing the pressing force to workpiece W. S=1 is a current condition representing how many amperes of the current is to be applied for how many seconds. ED=1 is an open position condition representing the distance between electrodes 21 and 22 after the spot welding. For these conditions, values are selected from predetermined tables. The format of the program instructions described above is merely an example in this embodiment. Other format of the program instructions may be used to describe the working programs for performing the spot welding.

As illustrated in FIG. 3, in this embodiment, Da and Db are set as the open position condition before the spot welding, and Dc and Dd are set as the open position condition after the spot welding. These open position conditions are set in consideration of a mechanical open range of spot welding gun 2 and a position of a surrounding obstacle 25 (for example, a jig for supporting the workpiece) and the like so that electrodes 21 and 22 do not interfere with obstacle 25.

A third line in FIG. 2A represents a program instruction instructing electrodes 21 and 22 to move to waiting positions after completing the spot welding. In response to this program instruction, electrodes 21 and 22 move to positions 3 in FIG. 3 that are separated from the respective workpiece surfaces by predetermined distances Dc and Dd, respectively, at a predetermined velocity (2000 mm/s) and temporarily stop there.

When there are a plurality of welding points, a sequential program corresponding to the plurality of welding points as illustrated in FIG. 2B is used, so that workpiece W is sequentially spot-welded at the plurality of welding points according to this program. In this case, in consideration of surrounding obstacles 25 at each welding point, the distances Da to Dd between electrodes 21 and 22 are set for each welding point, so that electrodes 21 and 22 do not interfere obstacles 25.

Even when electrodes 21 and 22 are moved to predetermined welding point positions to spot-weld workpiece W of the same type, due to the fact that workpiece W of a different lot is used or the position of the jig for mounting workpiece W is adjusted, the spot welding point positions may deviate from the target spot welding point positions on the workpiece surfaces. Such deviation results in problems such as overload on workpiece W, incorrect flow of welding current and the like and, as a result, welding quality is degraded. Thus, the welding point positions have to be corrected. However, it is very time and labor consuming to manually perform the correction for all of a plurality of welding point positions. Consequently, in this embodiment, the welding point positions are automatically corrected as follows.

FIG. 4 is a flowchart illustrating an example of a process performed in the whole of robot controller 3 and welding gun controller 4 according to the first embodiment of the present invention. The process illustrated in this flowchart is started, for example, in response to a start command from teaching control panel 5 operated by the operator or a start command from line control panel 6, and repeatedly performed for predetermined welding point positions.

In the memory, the spot welding point position on the bottom surface of the workpiece and the workpiece thickness to set in the working program are stored in advance as initial set values. Before issuing the start command, the operator inputs the mode switching command via line control panel 6 to select the operation mode. Further, the operator inputs the workpiece thickness detection command, the position correction command, the skip command, the retry command and the like as needed to set the processing conditions. The operation mode selected by the operator is transmitted from robot controller 3 to line control panel 6 and notified to the operator. The operation mode may also be indicated on display section 52 of teaching control panel 5 and display section 61 of line control panel 6.

In step S1 in FIG. 4, it is determined whether the spot position correction mode is selected by the signal from line control panel 6 or not. If a negative decision is made in step S1, it is determined that the spot welding mode is selected and the operation proceeds to step S2 to perform the spot welding process. That is, in step S2, according to the predetermined working programs (FIGS. 2A and 2B), control signals are output to servo motors 13 and 24 and control current corresponding to the welding conditions is output to electrodes 21 and 22. As a result, robot 1 and spot welding gun 2 operate and predetermined pressing forces are applied to workpiece W, so that workpiece W is spot-welded at the welding point position. If there are a plurality of welding point positions, the process in FIG. 4 is carried out repeatedly to sequentially spot-weld at the plurality of welding point positions.

On the other hand, if an affirmative decision is made in step S1, the operation proceeds to step S3 and, after that, the position correction process is performed in step S3 to step S15. First, in step S3, control signals are output to servo motors 13 and 24 to move electrodes 21 and 22 of spot welding gun 2 to predetermined open positions vertically above and vertically below the welding point positions of workpiece W. This process is performed by using the working programs of FIGS. 2A and 2B to move electrodes 21 and 22 to the open positions (indicated by dotted lines at the position 2) separated from the respective workpiece surfaces by Da and Db, respectively, along routes illustrated in FIG. 3. Because the working programs are created in consideration of the positions of obstacles 25 during the spot welding, the interference of electrodes 21 and 22 with workpiece W and obstacles 25 can be prevented by using the working programs.

Figure 5:
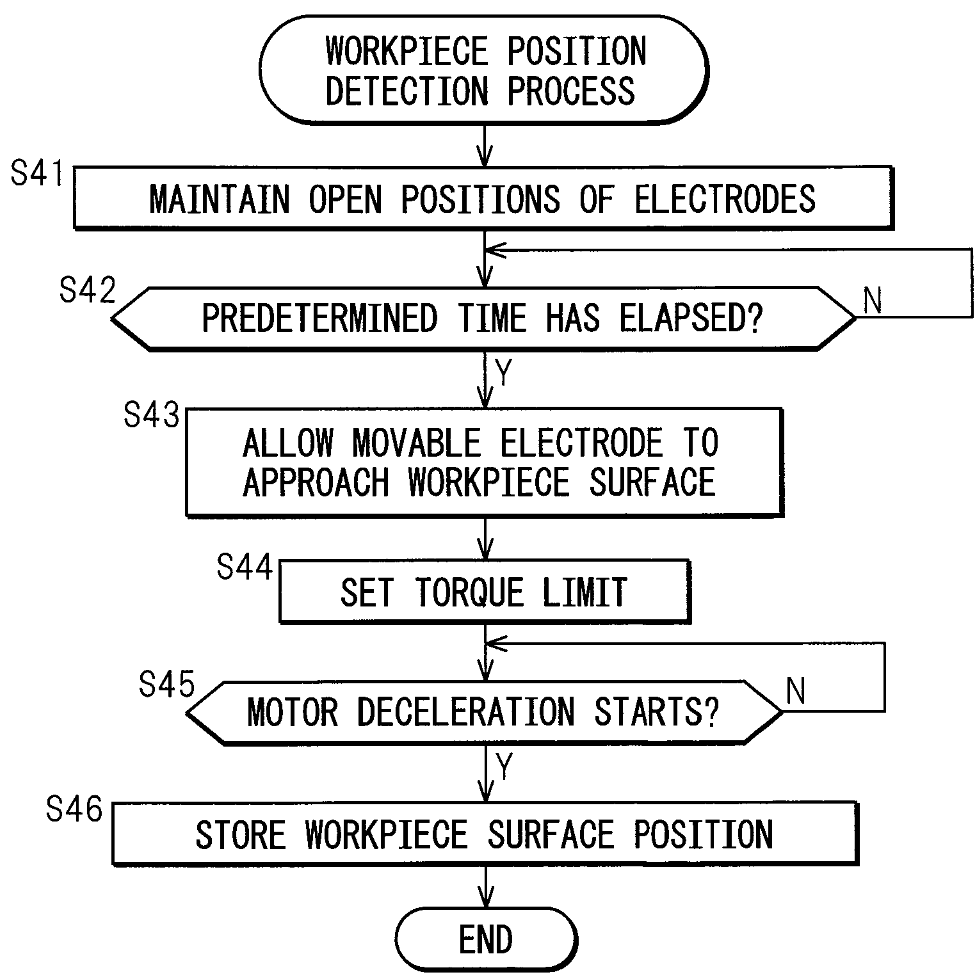
FIG. 5 is a flowchart specifically illustrating a workpiece position detection process of FIG. 4.
Figure 6A:
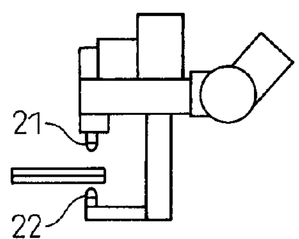
FIG. 6A is a diagram illustrating operations of the movable electrode and the counter electrode in the workpiece position detection process.
Figure 6B:
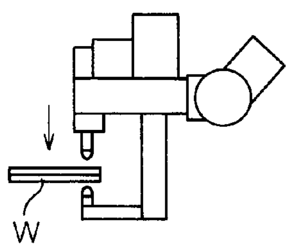
FIG. 6B is a diagram illustrating operations of the movable electrode and the counter electrode in the workpiece position detection process.
Figure 6C:
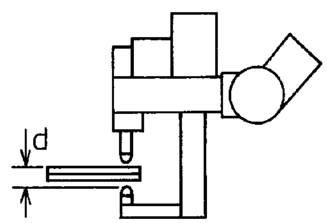
FIG. 6C is a diagram illustrating operations of the movable electrode and the counter electrode in the workpiece position detection process.
Figure 7:
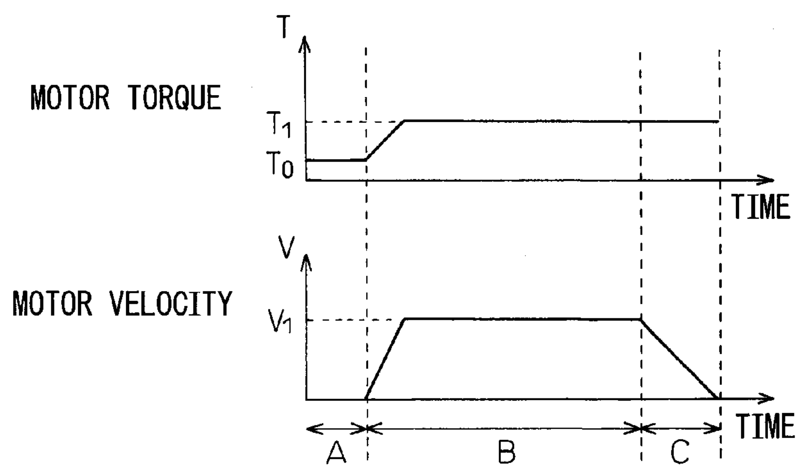
FIG. 7 is a diagram illustrating an example of variation over time of motor torque and motor velocity of a servo motor for driving the movable electrode in the workpiece position detection process.

In step S4, the workpiece position detection process described below is performed. FIG. 5 is a flowchart illustrating an example of the workpiece position detection process. FIGS. 6A to 6C are diagrams illustrating operations of electrodes 21 and 22 at the welding point positions when the workpiece position is detected. FIG. 7 is a diagram illustrating variation over time of motor torque T and motor velocity v of servo motor 24 when the workpiece position is detected.

Because the motor torque T correlates with a driving current of servo motor 24, the motor torque T of FIG. 7 can be determined based on the driving current output from welding gun controller 4. Because the motor velocity v correlates with a rotation velocity of servo motor 24, the motor velocity v of FIG. 7 can be determined, based on the rotation angle fed back from encoder 24*a*.

First, in step S41 in FIG. 5, control signals are output to allow servo motors 13 and 24 to maintain the open positions of electrodes 21 and 22 in step S3. As a result, as illustrated in FIG. 6A, electrodes 21 and 22 come to rest at the respective positions separated from the workpiece surfaces by the predetermined distances Da and Db, respectively. At this time, as illustrated in FIG. 7, the motor torque T is constant (T0) and the motor velocity v is 0. In step S42, it is determined whether a predetermined time (time A in FIG. 7) has elapsed or not. If an affirmative decision is made, the operation proceeds to step S43. The process in step S42 may be omitted.

In step S43, a control signal is output to servo motor 24 to allow movable electrode 21 to approach the workpiece surface as illustrated in FIG. 6B. In this case, as illustrated in FIG. 7, the velocity of servo motor 24 is controlled so that the motor velocity v is accelerated to a predetermined velocity v1 and, after that, the predetermined velocity v1 is maintained (section B). At this time, as illustrated in FIG. 7, the motor torque T increases to T1 and, after that, becomes constant when movable electrode 21 moves at a constant speed. In step S44, this motor torque T1 is set as a torque limit and the driving current of servo motor 24 is limited so that the motor torque T does not exceed the torque limit.

In step S45, based on the signal from encoder 24*a*, it is determined whether servo motor 24 starts deceleration or not. When movable electrode 21 abuts against the workpiece surface as illustrated in FIG. 6C, the load applied to servo motor 24 increases. However, because the motor torque T is limited to T1, the motor velocity v cannot be maintained at the predetermined velocity v1 and decelerates as illustrated in FIG. 7. For this reason, in step S45, a variation (inclination) of the motor velocity v is computed and, when the variation becomes negative, it is determined that movable electrode 21 abuts against the workpiece surface.

Alternatively, it may be determined that movable electrode 21 abuts against the workpiece surface when the motor velocity v is reduced by a predetermined value. Further, when the distance d between electrodes 21 and 22 computed from the rotation angle of servo motor 24 is less than or equal to a predetermined value, it may be determined that there is an abnormal detection, and the workpiece position detection process may be terminated. Thus, when workpiece W does not exist between electrodes 21 and 22 and the workpiece position cannot be detected due to significant deviation of the workpiece position and the like, the process can be terminated before movable electrode 21 abuts against counter electrode 22.

In step S46, based on the signals from encoders 13*a* and 24*a* when it is determined that movable electrode 21 abuts against the workpiece surface, the position of robot 1 and the distance d (FIG. 6C) between electrodes 21 and 22 are computed. Then, based on the robot position and the distance d, the position of the tip of movable electrode 21 or, in other words, the workpiece surface position is computed and stored in the memory. Further, by subtracting the workpiece thickness t0 determined as the initial set value from the distance d, the workpiece surface position of counter electrode 22 side is determined and stored in the memory. After that, the process of the workpiece position detection is terminated.

Figure 8:
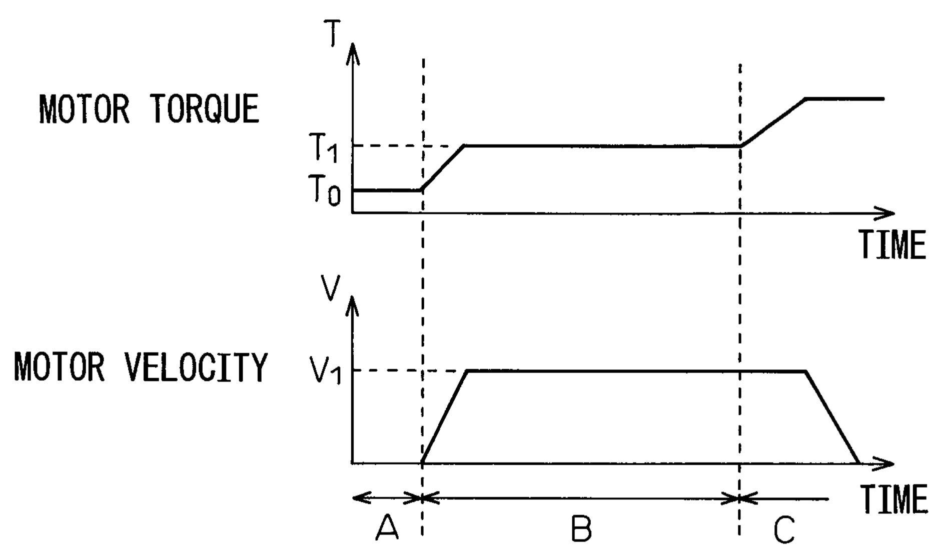
FIG. 8 is a diagram illustrating a variation of FIG. 7.

Though the workpiece position is detected based on the variation of the motor velocity v in the above description, the workpiece position may be detected based on the variation of the motor torque T. In this case, the velocity of servo motor 24 is controlled similarly to that described above without setting a torque limit. FIG. 8 is a characteristic diagram illustrating variation over time of the motor torque T and motor velocity v in these conditions.

In the case in which the torque limit is not set, after movable electrode 21 abuts against the workpiece surface, in an effort to maintain the constant motor velocity v1, the load applied to motor 24 increases and the motor torque T becomes larger than T1 as illustrated in FIG. 8. Consequently, it is determined whether the motor torque T becomes larger than T1 or not, and, when T becomes larger than T1, it is determined that movable electrode 21 abuts against the workpiece surface. Based on the position of robot 1 and the distance d between electrodes 21 and 22 at this time, the workpiece position can be detected.

After the workpiece position detection process is completed, the process of step S5 in FIG. 4 is performed. In Step S5, it is determined whether the workpiece position determined in step S4 is abnormal or not. For example, a deviation amount between a predetermined welding point position and the detected workpiece surface position is computed and, if this deviation amount is larger than or equal to a predetermined value, it is determined that there is an abnormal detection. On the other hand, also when workpiece W is not detected in step S4, it is determined that there is the abnormal detection.

If it is determined that the workpiece position is normal in step S5, the operation proceeds to step S6. In step S6, it is determined whether the workpiece thickness detection command is input in advance or not. If an affirmative decision is made in step S6, the operation proceeds to step S7 and if a negative decision is made, the operation skips step S7 and step S8 and proceeds to step S9.

Figure 9:
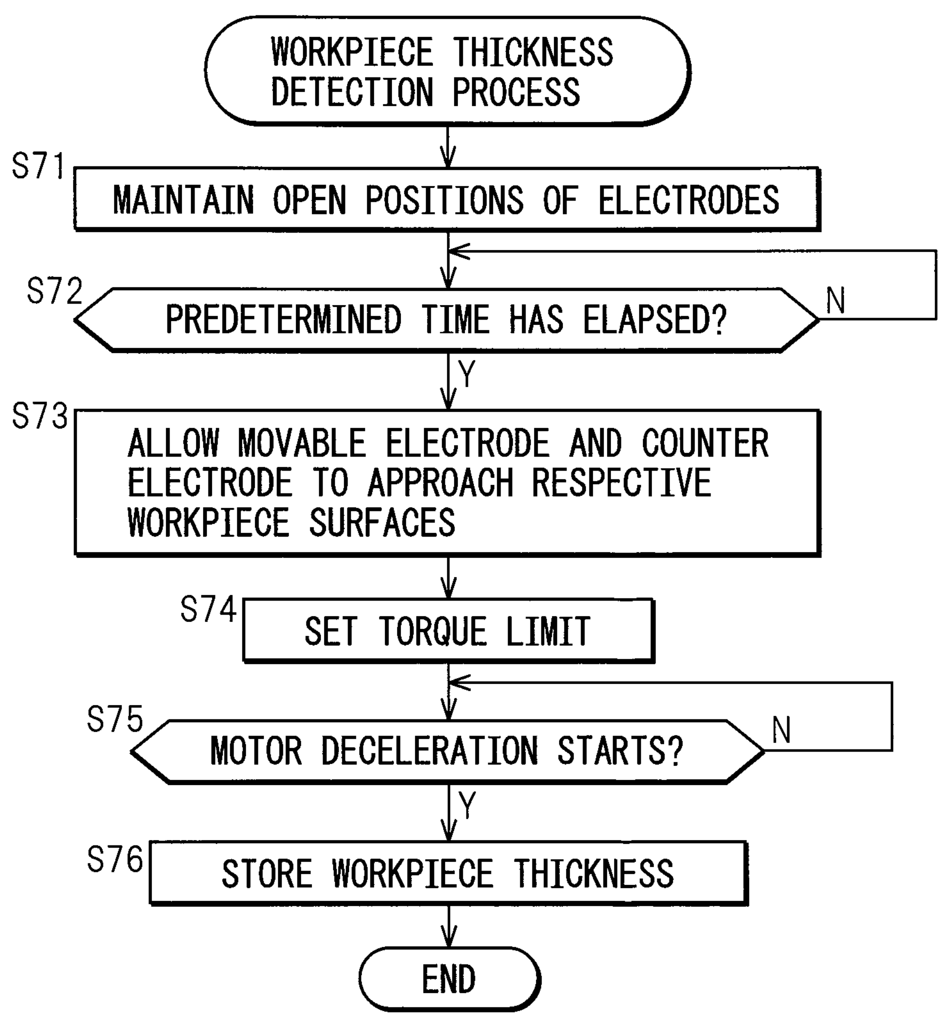
FIG. 9 is a flowchart specifically illustrating a workpiece thickness detection process of FIG. 4.
Figure 10A:
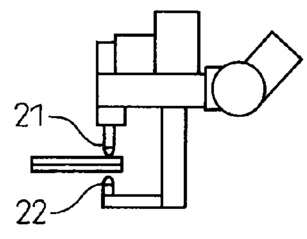
FIG. 10A is a diagram illustrating operations of the movable electrode and the counter electrode in the workpiece thickness detection process.
Figure 10B:
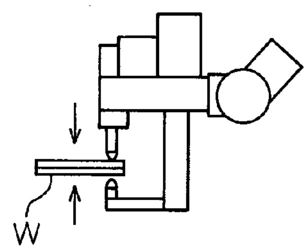
FIG. 10B is a diagram illustrating operations of the movable electrode and the counter electrode in the workpiece thickness detection process.
Figure 10C:
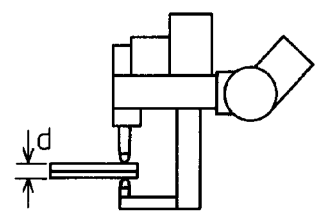
FIG. 10C is a diagram illustrating operations of the movable electrode and the counter electrode in the workpiece thickness detection process.
Figure 11:
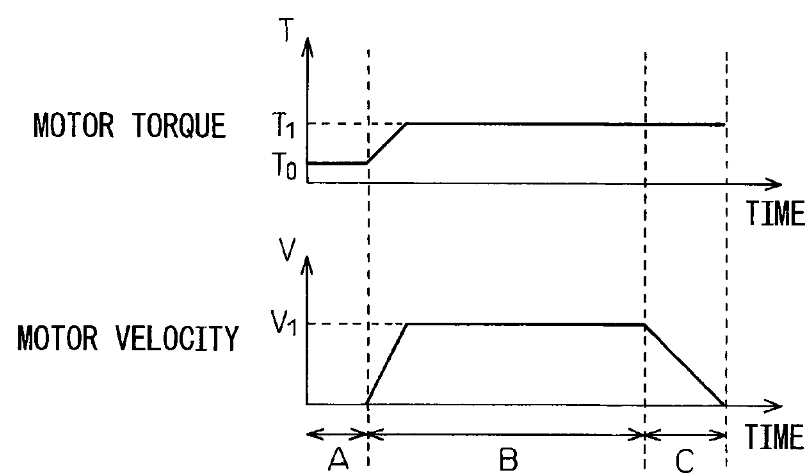
FIG. 11 is a diagram illustrating an example of variation over time of the motor torque and motor velocity of the servo motor for driving the movable electrode in the workpiece thickness detection process.

In step S7, the workpiece thickness detection process described below is performed. FIG. 9 is a flowchart illustrating an example of the workpiece thickness detection process. FIGS. 10A to 10C are diagrams illustrating operations of electrodes 21 and 22 at the welding point positions when the workpiece thickness is detected. FIG. 11 is a diagram illustrating variation over time of the motor torque T and the motor velocity v of servo motor 24 when the workpiece thickness is detected.

First, in step S71 in FIG. 9, control signals are output to allow servo motors 13 and 24 to maintain the positions of electrodes 21 and 22 when the workpiece position is detected. As a result, as illustrated in FIG. 10A, movable electrode 21 stops moving while abutting against the workpiece surface, and counter electrode 22 stops moving while it is separated from the workpiece surface by the predetermined distance Db. At this time, as illustrated in FIG. 11, the motor torque T is constant (T0) and the motor velocity v is 0. In step S72, it is determined whether a predetermined time (time A in FIG. 11) has elapsed or not. If an affirmative is made, the operation proceeds to step S73. The process in step S72 may be omitted.

In step S73, a control signal is output to servo motor 13 to allow counter electrode 22 to approach the workpiece surface at a predetermined velocity as illustrated in FIG. 10B. At the same time, a control signal is output to servo motor 24 to allow movable electrode 21 approach the workpiece surface at the same velocity as that of counter electrode 22 so that movable electrode 21 does not become separated from the workpiece surface. Thus, as counter electrode 22 moves, movable electrode 21 also moves integrally. At this time, movable electrode 21 is moved in the direction opposite to that of counter electrode 22 to prevent movable electrode 21 from separating from the workpiece surface. As a result, while workpiece W is fixed and movable electrode 21 abuts against the workpiece surface, counter electrode 22 approaches the workpiece surface.

In this case, as illustrated in FIG. 11, the velocity of servo motor 24 is controlled so that the motor velocity v is accelerated to a predetermined velocity v1 and, after that, the predetermined velocity v1 is maintained (section B). Further, the velocity of servo motor 13 is also controlled so that the driving velocity of counter electrode 22 is equal to that of movable electrode 21. At this time, as illustrated in FIG. 11, the motor torque T increases to T1 and, after that, becomes constant when movable electrode 21 moves at a constant speed. In step S74, this motor torque T1 is set as a torque limit and the driving current of servo motor 24 is limited so that the motor torque T does not exceed the torque limit.

In step S75, based on the signal from encoder 24*a*, it is determined whether servo motor 24 starts deceleration or not. When counter electrode 22 abuts against the workpiece surface as illustrated in FIG. 10C, the load applied to servo motor 24 increases. However, because the motor torque T is limited to T1, the motor velocity v cannot be maintained at the predetermined velocity v1 and decelerates as illustrated in FIG. 11. For this reason, in step S75, a variation (inclination) of the motor velocity v is computed and, when the variation becomes negative, it is determined that counter electrode 22 abuts against the workpiece surface or, in other words, electrodes 21 and 22 sandwich workpiece W therebetween. Alternatively, it may be determined that counter electrode 22 abuts against the workpiece surface when the motor velocity v is reduced by a predetermined value.

In step S76, based on the signal from encoder 24*a* when it is determined that counter electrode 22 abuts against the workpiece surface, the distance d (FIG. 10C) between electrodes 21 and 22 is computed. This distance d that corresponds to the actual workpiece thickness t is stored in the memory. After that, the process of the workpiece thickness detection is terminated.

Alternatively, this detected workpiece thickness t may be used to recompute the workpiece surface position of counter electrode 22 side. Thus, in step S4 in FIG. 4, after computing the workpiece surface position of movable electrode 21 side, the workpiece surface position of counter electrode 22 may be determined by subtracting the workpiece thickness t from the distance d between electrodes 21 and 22. Though the workpiece thickness is detected based on the variation of the motor velocity v in the above description, the workpiece thickness may be detected based on the variation of the motor torque T without setting the torque limit, similarly to FIG. 8.

After the workpiece thickness detection process is completed, the process of step S8 in FIG. 4 is performed. In step S8, it is determined whether the workpiece thickness t determined in step S7 is abnormal or not. For example, a deviation between a predetermined workpiece thickness t0 and the detected workpiece thickness t is computed and, if the deviation is equal to or larger than a predetermined value, it is determined that there is an abnormal detection.

If the workpiece thickness is determined to be normal in step S8, the operation proceeds to step S9. In step S9, a deviation between the spot welding point position on the bottom surface of the workpiece stored in advance and the workpiece surface position of counter electrode 22 determined by the workpiece position detection process (step S4) is determined and stored in the memory as a position correction amount. When the current programs are terminated, this stored data is transmitted to line control panel 6, for example. Consequently, the operator can read the position correction amount via the display section and the like connected to line control panel 6.

In step S10, it is determined whether the position correction command is input in advance or not. If an affirmative decision is made in step S10, the operation proceeds to step S11. On the other hand, if an negative decision is made in step S10, the program skips step S11 and proceeds to step S12. In step S11, the spot welding point position determined as the initial set value is corrected by the position correction amount in step S9 and the positional data after the correction is stored in the memory. Further, if the workpiece thickness detection process (step S7) has been performed, the workpiece thickness t0 determined as the initial set value is corrected to the workpiece thickness t obtained by the workpiece thickness detection process and the thickness data after the correction is stored in the memory. The working program is rewritten by these positional data and thickness data after the correction.

In step S12, control signals are output to servo motors 13 and 24 to allow electrode 21 and 22 to move to the predetermined open positions. This process is performed by using the working programs of FIGS. 2A and 2B to move electrodes 21 and 22 to the open positions (position 3) separated from the respective workpiece surfaces by Dc and Dd, respectively, along routes illustrated in FIG. 3. After that, the process at the predetermined welding point positions is terminated. When there are a plurality of welding points, a similar process is performed at the next welding point positions.

On the other hand, if the workpiece position is determined to be abnormal in step S5, or if the workpiece thickness is determined to be abnormal in step S8, the operation proceeds to step S13. In step S13, it is determined whether the skip command is input in advance or not. If an affirmative decision is made in step S13, the subsequent process is skipped and the process at the predetermined welding point positions is terminated. Alternatively, the process may be terminated after moving electrodes 21 and 22 to the predetermined open positions (for example, position 3 in FIG. 3).

If a negative decision is made in Step S13, the operation proceeds to step S14. In step S14, it is determined whether the retry command is input in advance or not. If an affirmative decision is made in step S14, the operation returns to step S3 to perform the process after step S3 again. If a negative decision is made in step S14, the operation proceeds to step S15 to output an alarm. For example, control signals are output to teaching control panel 5 or line control panel 6 to indicate that the workpiece position or workpiece thickness is abnormal on display section 52 or 61 and the like and, after that, the operation is terminated. Alternatively, when the workpiece position or workpiece thickness is abnormal, the alarm may be output even when the skip or retry is selected.

When there are a plurality of welding points but it is desired that the process of the spot position correction mode is carried out at specific welding points, for example, a command to enable or disable the spot position correction mode may be issued by operation of teaching control panel 5, every time the process in FIG. 4 is terminated. In this case, if the command to enable the spot position correction mode is issued, the process in FIG. 4 may be carried out at the spot welding point positions. However, if the command to disable the spot position correction mode is issued, the process in FIG. 4 may not be performed and electrodes 21 and 22 simply pass through the spot welding point positions.

Further, the command to enable ordisable the spot position correction mode may be incorporated into the program in advance. FIGS. 12A and 12B are diagrams illustrating an example of this case and corrected versions of the working programs in FIGS. 2A and 2B. In this case, in the spot position correction mode, the position correction process is performed according to the spot welding instructions in the figures, but the commands such as P=1, S=1 and the like are ignored.

FIG. 12A is an example in which the position correction is performed if the instruction disabling the position correction is not added. On the other hand, FIG. 12B is an example in which the position correction is performed if the position correction instruction is added. Thus, in FIG. 12A, the spot welding instruction (position correction instruction) is included in the second and fourth lines and, further, the instruction disabling the position correction is added to the fourth line. Consequently, the position correction process is performed at position 2 but the position correction process is not performed at position 4. On the other hand, in FIG. 12B, the spot welding instruction (position correction instruction) is also included in the second and fourth lines and, further, the position correction instruction is added to the fourth line. Consequently, the position correction process is not performed at position 2 but the position correction process is performed at position 4.

When the instruction to enable/disable the position correction process is incorporated into the program as described above, the position correction process does not have to be interrupted every time the welding point positions are altered. Rather, the position correction of the welding point positions can be performed only at arbitrary welding point positions. Consequently, the position correction process can be easily carried out only at representative positions among a large number of welding point positions.

The first embodiment can be summarized as follows. When the spot welding mode is selected as the operation mode, robot 1 and spot welding gun 2 operate according to the working program, so that electrodes 21 and 22 move to predetermined welding point positions to sandwich workpiece W and perform the spot welding (step S2). When there are a plurality of welding point positions, the process in FIG. 4 is repeated so that electrodes 21 and 22 sequentially move to the plurality of welding point positions and perform the spot welding at the welding point positions.

When the position correction mode is selected as the operation mode, first, movable electrode 21 and counter electrode 22 move to the open positions where movable electrode 21 and counter electrode 22 are separated from the respective workpiece surfaces by the predetermined distances Da and Db, respectively (step S3). After that, movable electrode 21 approaches workpiece W at a predetermined velocity to abut against the workpiece surface. At this time, based on the variation of the motor velocity v (FIG. 7), the instant when movable electrode 21 abuts against the workpiece surface is determined. Then, based on the position of robot 1 and the distance d between electrodes 21 and 22 at that time, the workpiece surface positions are detected (step S4). Thus, it is not necessary to attach a dedicated device for detecting the workpiece position and the workpiece position can be easily detected.

When the workpiece thickness detection is further selected, counter electrode 22 approaches the workpiece surface and abuts against it while movable electrode 21 abuts against the workpiece surface. At this time, based on the variation of the motor velocity v (FIG. 11), the instant electrodes 21 and 22 sandwich workpiece W is determined. Then, based on the distance d between electrodes 21 and 22 at that time, the workpiece thickness t is detected (step S7). Thus, it is not necessary to attach a dedicated device for detecting the workpiece thickness and the workpiece thickness can be easily detected.

Based on the workpiece position or the workpiece position and workpiece thickness t determined as described above, the workpiece surface position is computed and the deviation between the computed workpiece surface position and the predetermined welding point position (the position correction amount) is stored (step S9). When the position correction is further selected, the welding point position is corrected by using the position correction amount. As a result, even when the welding point positions are deviated between different workpieces, the spot welding can be accurately performed. After that, electrodes 21 and 22 move to the open positions that are separated from the respective workpiece surfaces by the predetermined amounts Dc and Dd, respectively (Step S12).

In the spot position correction mode, if any of the detected values of the workpiece position and workpiece thickness are abnormal, the process after that is skipped or retried according to the operator's selection (step S13, step S14) or an alarm is output and the process is terminated (step S15).

The first embodiment can exhibit the following effects.

(1) In the spot welding mode, based on the variation of the velocity of servo motor 24 for driving the movable electrode when movable electrode 21 is moved closer to workpiece W at a constant velocity, it is determined whether movable electrode 21 abuts against the workpiece surface or not. Then, based on the position of robot 1 and the distance d between electrodes 21 and 22 when it is determined that movable electrode 21 abuts against the workpiece surface, the workpiece position is computed (step S4). As a result, the welding point positions can be corrected without using the imaging and other devices that are not necessary during the spot welding. Consequently, because it is not necessary to attach or detach the imaging and other devices, the operations of the spot welding and the spot position correction can be quickly performed. Further, cost of the imaging and other devices can be reduced.

(2), Based on the variation of the velocity of servo motor 24 when counter electrode 22 is moved closer to the workpiece surface while movable electrode 21 abuts against the workpiece surface, it is determined whether counter electrode 22 abuts against the workpiece surface or not. Then, based on the distance d between electrodes 21 and 22 when it is determined that counter electrode 22 abuts against the workpiece surface, the workpiece thickness t is computed (step S7). As a result, the deviation of the workpiece thickness t can also be corrected and the welding point positions can be corrected more accurately.

(3) Based on the command issued via line control panel 6, the operation mode is switched and the selected operation mode is notified via the line control panel 6. As a result, the operation mode can be managed in a unified way.

(4) The open positions of electrodes 21 and 22 in the position correction mode are controlled based on the open positions of electrodes 21 and 22 in the spot welding mode (step S3 and step S12). As a result, in the position correction mode, the interference between electrodes 21 and 22 and obstacle 25 can be prevented.

(5) In the position correction mode, it is determined whether the detected workpiece position or the workpiece thickness is abnormal or not. However, if any of them is abnormal, the process is skipped or retried according to the operator's selection. As a result, when the process is skipped, the operation can proceed to the subsequent program instruction and the working program can be smoothly executed. On the other hand, when the process is retried, even if an accidental or temporary abnormality occurs, the spot welding point positions can be properly corrected. When neither the skip nor the retry is selected, an alarm is output and the process is terminated (step S15). As a result, the operator can easily recognize whether the workpiece position or workpiece thickness is abnormal or not.

(6) Regardless of whether the position correction is actually performed or not, the position correction amount that is the deviation between the welding point positions stored in advance and the detected workpiece positions is stored (step S9). As a result, the operator can check the position correction amount and effectively use it for quality control of workpiece W and the like.

(7) The process of the workpiece thickness detection (step S7) is performed according to the operator's selection. As a result, when the accuracy of workpiece thickness is secured, unnecessary operation does not have to be performed and the position correction can be efficiently performed.

(8) The position correction is performed according to the operator's selection (step S11). As a result, the position correction amount can be only checked without performing the position correction.

A Second Embodiment

Figure 13:
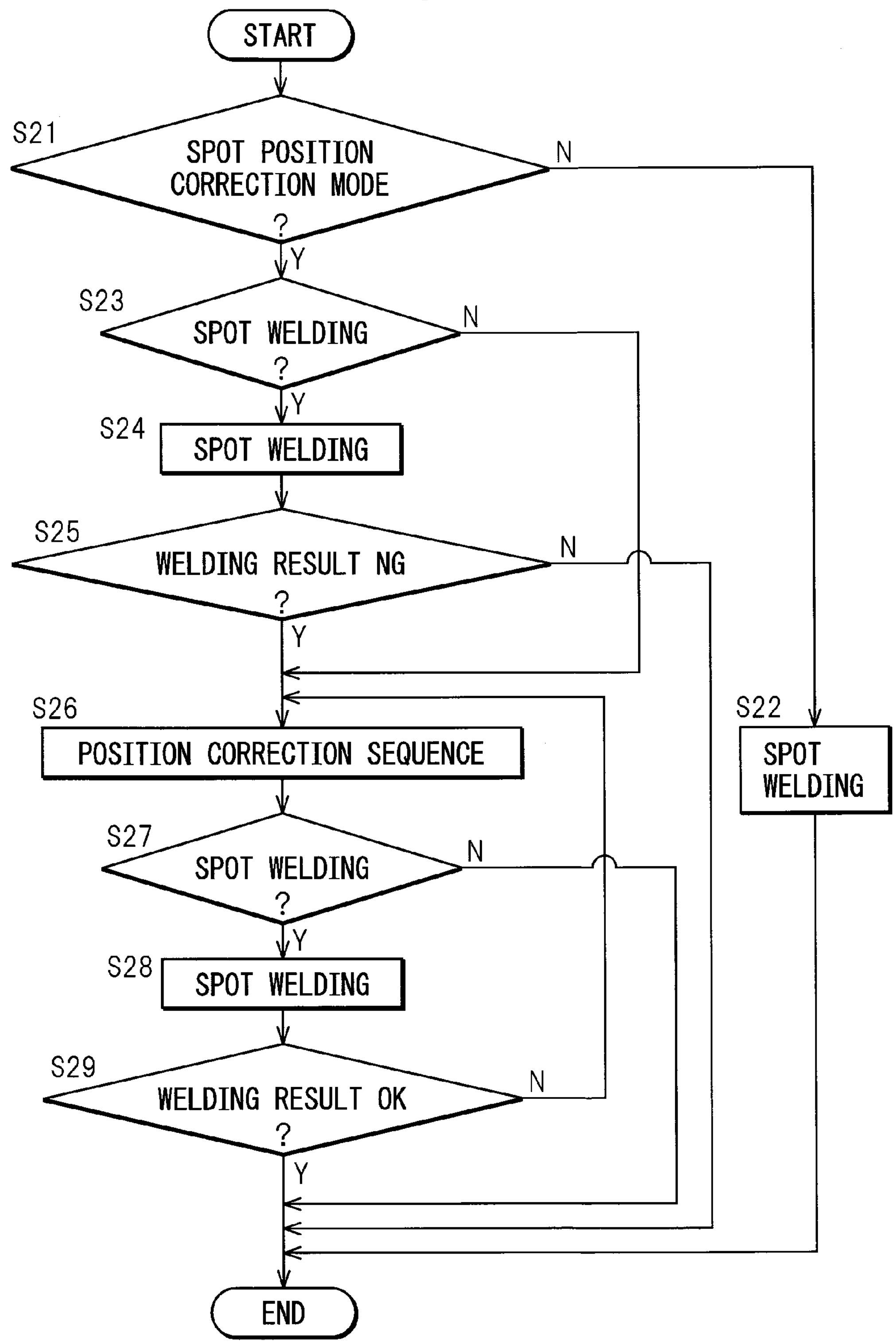
FIG. 13 is a flowchart illustrating an example of a process performed in a robot controller and a welding gun controller according to a second embodiment of the present invention.

Referring to FIG. 13, a spot welding system according to a second embodiment of the present invention will be described. The second embodiment differs from the first embodiment in that, in the spot position correction mode, in addition to the process of the first embodiment, workpiece W is actually spot-welded and its welding result is validated so as to verify validity of the position correction. Hereinafter, differences from the first embodiment will be mainly described.

FIG. 13 is a flowchart illustrating an example of a process performed in the whole of robot controller 3 and welding gun controller 4 according to the second embodiment of the present invention. In the second embodiment, it is selected in advance whether the spot welding is carried out or not before the position correction process (a spot welding command before processing) and whether the spot welding is performed or not after the position correction process (a spot welding command after processing). These commands are input to robot controller 3 via line controller the line control panel 6 by the operator's operation. These commands may also be issued by operating teaching control panel 5.

In step S21, based on the signal from line control panel 6, it is determined whether the spot position correction mode is selected or not. If an affirmative decision is made in step S21, the operation proceeds to step S23. On the other hand, If a negative decision is made, the operation proceeds to step S22. In step S22, the spot welding process similar to that in step S2 in FIG. 4 is performed. In step S23, based on the signal from line control panel 6, it is determined whether the spot welding command before the position correction process is issued or not.

If an affirmative decision is made in step S23, the operation proceeds to step S24. On the other hand, if a negative decision is made, the operation skips step S24 and step S25, and proceeds to step S26. In step S24, workpiece W is spot-welded on welding conditions according to the working program. Thus, a control signal is output to servo motor 24 so as to apply a predetermined pressing force to workpiece W and a predetermined control current is supplied to electrodes 21 and 22.

In step S25, it is determined whether the spot welding is normally performed or not. For example, in order to determine whether the spot welding is normal or not, based on the motor torque T, it is determined whether the pressing force applied to workpiece W is normal or not. The pressing force may be detected by a different sensor that detects other than motor torque T. It may be determined whether the spot welding is normal or not based on whether the predetermined control current flows through electrodes 21 and 22 or not. Further, in order to determine whether the spot welding is normal or not, based on the distance d between electrodes 21 and 22, it may be determined whether welding nuggets formed on workpiece W (bulges of workpiece W formed during the welding) are good or bad. A distortion sensor may be attached to the workpiece surface to determine whether the welding nuggets are good or bad.

If the spot welding result is determined to be abnormal in step S25, the operation proceeds to step S26. On the other hand, if the spot welding result is determined to be normal, it is determined that the position correction process is not required and the operation is terminated. In step S26, the position correction process similar to those in steps S3 to S15 in FIG. 4 is performed. In this case, the position correction amount is determined to correct the welding point positions (step S11). In step S27, based on the signal from line control panel 6, it is determined whether the spot welding command after the position correction process is issued or not.

If an affirmative decision is made in step S27, the operation proceeds to step S28. On the other hand, If a negative decision is made, the operation is terminated. In step S28, workpiece W is spot-welded according to the working program including the corrected welding point positions. Thus, a control signal is output to servo motor 24 so that a predetermined pressing force is applied to workpiece W and a predetermined control current is supplied to electrodes 21 and 22. If the workpiece position is determined to be abnormal in step S26, the operation may be terminated without performing the spot welding.

In step S29, similarly to step S25, it is determined whether the spot welding is performed normally or not. If an affirmative decision is made in step S29, it is determined that the spot welding is performed normally and the operation is terminated. On the other hand, if a negative decision is made in step S29, it is determined that the spot welding is not performed normally and the operation returns to step S26 to perform the position correction process again.

Thus, in the second embodiment, workpiece W is spot-welded before the position correction process, by the process according to the operator's selection (step S24) and it is determined whether the welding result is good or bad. As a result, it can be appropriately judged whether to perform the position correction process or not. Further, workpiece W is spot-welded after the position correction process, by the process according to the operator's selection (step S28) and it is determined whether the welding result is good or bad. As a result, the validity of the position correction process can be verified.

In the above embodiments, in order to detect the workpiece position and workpiece thickness, the motor velocity v is detected by encoder 24*a* of servo motor 24, or motor torque T that is correlative to the motor current is detected. However, any physical quantity correlative to the torque T or velocity v of servo motor 24, such as the torque, current, velocity, acceleration and the like may be detected and the physical quantity detection section is not limited to that described above.

Based on the variation of the detected motor velocity v (FIG. 7) or motor torque T (FIG. 8), it is determined whether movable electrode 21 abuts against the workpiece surface or not and, further, based on the variation of the motor velocity v (FIG. 11), it is determined whether counter electrode 22 abuts against the workpiece surface or not while movable electrode 21 abuts against the workpiece surface. However, the configuration of controllers 3 and 4 as the abutment determination section is not limited to that described above. For example, because the moving velocity of movable electrode 21 exhibits characteristics similar to those of the motor velocity v, the moving velocity of movable electrode 21 may be detected and, based on this moving velocity, the abutment against the workpiece surface may be determined. In place of moving electrode 21, counter electrode 22 may be abutted against the workpiece surface and, based on the variation of the physical quantity at that time, the abutment may be determined.

Based on the signals from encoders 13*a* and 24*a*, the position of robot 1 and the distance d between electrodes 21 and 22 are detected and, based on these detected values, the positions of electrodes 21 and 22 are detected by computation in controllers 3 and 4. However, the position detection section is not limited to that described above. In response to the external signal (switching command) from line control panel 6 as the external signal output section, the operation mode of the system is switched between the spot welding mode and the position correction mode. However, the operation mode may be switched in response to the command from teaching control panel 5. Thus, the configuration of the mode switching section is not limited to that described above. The spot welding process and the position correction process in FIGS. 4 and 13 are performed by CPUs of robot controller 3 and welding gun controller 4. However, robot controller 3 and welding gun controller 4 may be integrated into one controller. Thus, robot controller 3 may include functions of welding gun controller 4 and the configuration of the processing section is not limited to that described above.

In the spot welding mode, workpiece W is spot-welded based on the spot welding point positions set in the working program. On the other hand, in the position correction mode, spot welding gun 2 and robot 1 are controlled so that movable electrode 21 abuts against the workpiece surface. However, controllers 3 and 4 as the spot welding gun and robot control section may be configured in any way. Based on the position of movable electrode 21 when movable electrode 21 abuts against the workpiece surface, the workpiece position on the side of movable electrode 21 is computed and, further, based on the position of movable electrode 21 and the predetermined workpiece thickness t0, the workpiece position on the side of counter electrode 22 is computed (step S46). However, the configuration of the computation section is not limited to that described above. The configuration of controllers 3 and 4 as the correction section for correcting the workpiece positions is also not limited to that described above.

The open positions of electrodes 21 and 22 in the position correction mode are controlled based on the open positions of electrodes 21 and 22 in the spot welding mode (step S3, step S12). However, the configuration of the open position control section is not limited to that described above. When the open positions of electrodes 21 and 22 are set allowing margins for obstacle 25, the controlled positions may be altered according to the margins. The operation mode is notified to the operator via line control panel 6. However, the operation mode may be notified via teaching control panel 5 and the notification section may be configured in any way.

The controllers 3 and 4 as the abnormality determination section for determining the abnormality of the workpiece position or workpiece thickness may be configured in any way. The skip or retry process after the abnormality determination may be performed after waiting for the operator's instruction. The correction amount of the workpiece position is stored in the memory of controller 3 and 4. However, it may be stored in other storage sections. It is set whether the position correction process is performed or not according to the predetermined working program (FIGS. 12A and 12B). However, the configuration of the setting section is not limited to that described above.

So long as the spot welding system has spot welding gun 2 having a pair of electrodes 21 and 22 that approach each other and separate from each other by servo motor 24, and robot 1 for movably holding either one of spot welding gun 2 and workpiece W with respect to the other so that workpiece W is disposed between electrodes 21 and 22, the overall configuration of the spot welding system is not limited to that of FIG. 1. For example, both movable electrode 21 and counter electrode 22 may be movable with respect to frame 23*a* of spot welding gun 2.

Figure 14:
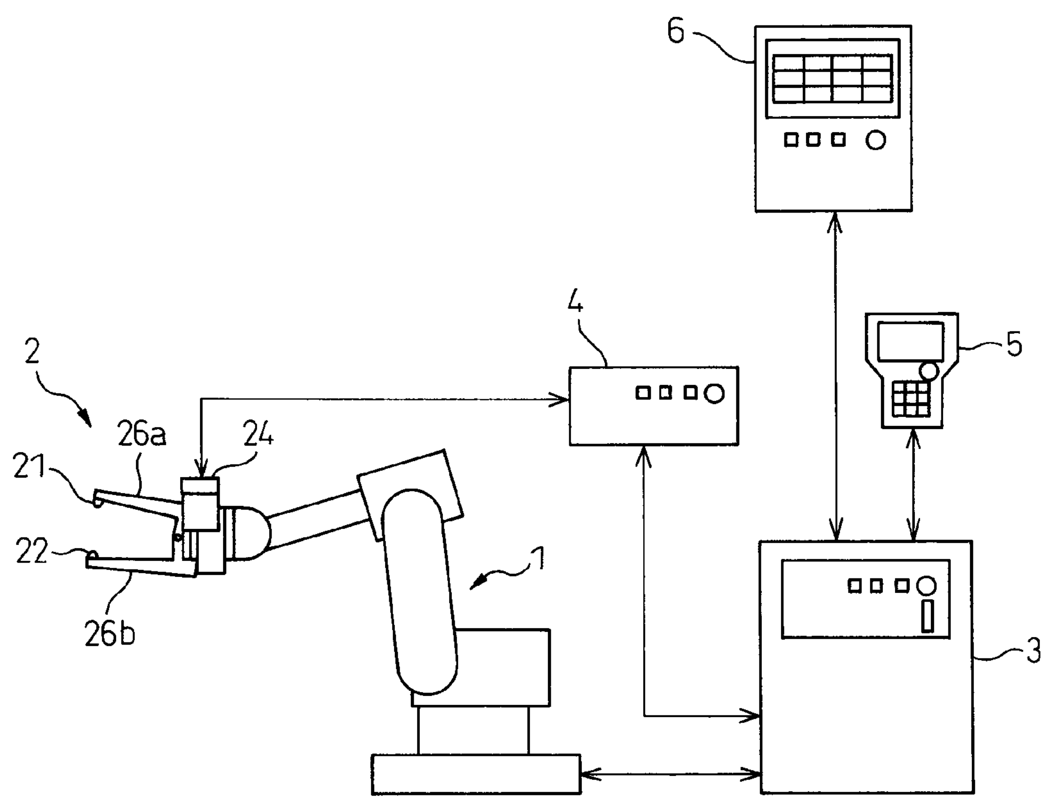
FIG. 14 is a diagram illustrating a variation of FIG. 1.
Figure 15:
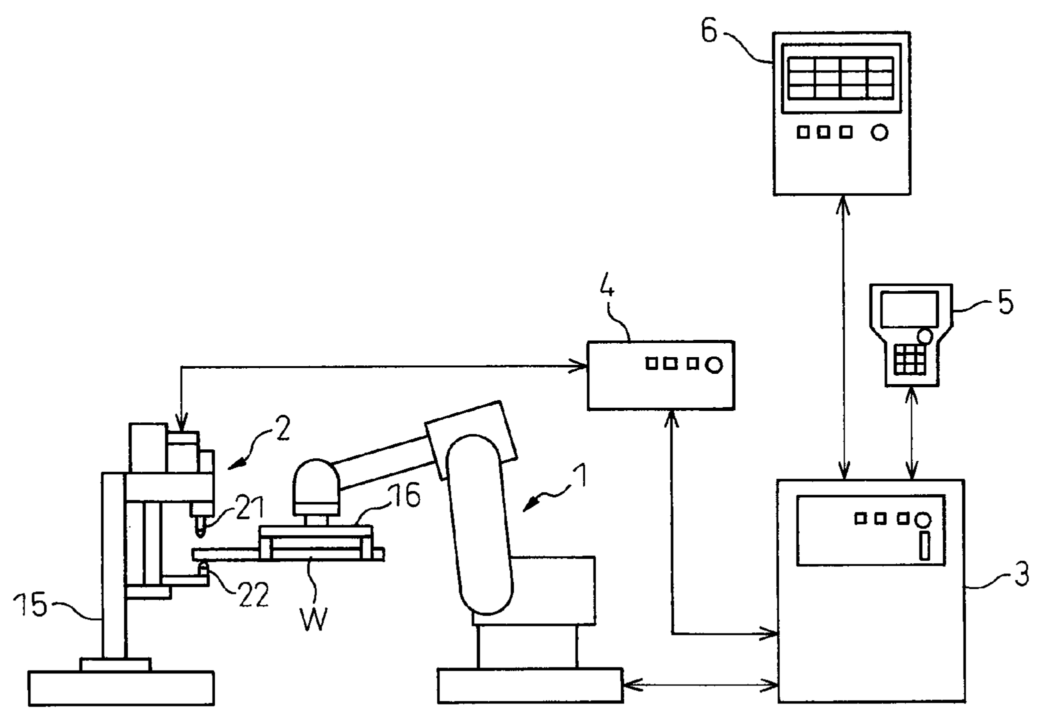
FIG. 15 is a diagram illustrating another variation of FIG. 1.

The spot welding system may be configured as illustrated in FIG. 14 or 15. FIG. 14 illustrates an example in which spot welding gun 2 is configured as a so-called X-type spot welding gun that has a pair of openable and closeable gun arms 26*a* and 26*b*, and movable electrode 21 and counter electrode 22 attached to tips of gun arms 26*a* and 26*b*, respectively. FIG. 15 illustrates an example in which spot welding gun 2 is supported by a gun stand 15 disposed at a predetermined position and workpiece W is held by a robot hand 16 at a tip of robot 1, so that workpiece W is moved with respect to spot welding gun 2 and disposed between electrodes 21 and 22 by driving power of robot 1. The gun stand 15 may be configured movable.

According to the present invention, the actual workpiece position can be detected without using the imaging device. Consequently, because it is not necessary to attach or detach the imaging devices, the operation of the workpiece position correction at the welding point positions can be quickly carried out.

While the invention has been described with reference to specific preferred embodiments, it will be understood, by those skilled in the art, that various changes or modifications may be made thereto without departing from the scope of the following claims.

The invention claimed is:

1. A method of spot welding comprising:

obtaining access to a spot welding system, including:

a spot welding gun having a pair of electrodes disposed oppositely to each other, and a servo motor for allowing the pair of electrodes to approach each other and separate from each other;

a robot for holding either one of the spot welding gun and a workpiece in a manner movable relative to each other so that the workpiece is disposed between the pair of electrodes of the spot welding gun;

a first detection section for detecting a torque or rotation velocity of the servo motor;

a second detection section for detecting positions of the pair of electrodes;

a mode switching section for switching, in response to a switching command by manipulation of an operator, an operation mode, that is a control mode, of the spot welding system between a spot welding mode for spot-welding the workpiece and a position correction mode for correcting a spot welding position of the workpiece; and a processing section for performing a spot welding process in the spot welding mode and a position correction process in the position correction mode, controlling the spot welding gun and the robot with a spot welding gun and robot control section that is part of the processing section with the operation mode switched into the spot welding mode by the mode switching section so that the workpiece is spot-welded based on a workpiece position set in a predetermined working program and controlling the spot welding gun and the robot with the spot welding gun and robot control section with the operation mode switched into the position correction mode so that only one of the pair of electrodes abuts against a surface of the workpiece;

determining whether only one of the pair of electrodes abuts against the surface of the workpiece or not with an abutment determination section that is part of the processing section based on a value detected by the first detection section in the position correction mode; and a computation section for computing the workpiece position using a computation section that is part of the processing section based on a value detected by the second detection section when the abutment determination section determines that only one of the pair of electrodes abuts against the surface of the workpiece.

2. A method of spot welding according to claim 1, wherein the processing section of the spot welding system to which access is obtained further includes an open position control section, the method further including controlling open positions of the pair of electrodes in the position correction mode based on open positions of the pair of electrodes in the spot welding mode.

3. A method of spot welding according to claim 1, wherein the spot welding system to which access is obtained further includes an external signal output section, wherein the method further includes outputting an external signal from the external signal output section corresponding to a predetermined processing command, to each of a plurality of the processing sections, which are provided for a plurality of the robots, wherein the method further includes switching, with the mode switching section, the operation mode based on the external signal output from the external signal output section.

4. A method of spot welding according to claim 1, wherein the spot welding system to which access is obtained further comprises a notification section, wherein the method further includes notifying, with the notification section, the operation mode switched by the mode switching section.

5. A method of spot welding according to claim 1, further comprising:

controlling, with the spot welding gun and robot control section, the spot welding gun and the robot when the operation mode is switched into the position correction mode, so that while one of the pair of electrodes abuts against one of surfaces of the workpiece, the other of the pair of electrodes comes into abutment against the other of the surfaces of the workpiece, determining, with the abutment determination section, whether the other of the pair of electrodes abuts against the other of the surfaces of the workpiece or not, based on a variation of the value detected by the first detection section after determining that the one of the pair of electrodes abuts against the one of the surfaces of the workpiece, and computing, with the computation section, a workpiece thickness based on a value detected by the second detection section when the abutment determination section determines that the pair of electrodes abut against the both surfaces of the workpiece, and computes the workpiece position based on the workpiece thickness and the value detected by the second detection section.

6. A method of spot welding according to claim 5, further comprising determining, with an abnormality determination section of the processing section, whether there is an abnormality in the position correction process pertaining to detecting the workpiece position or the workpiece thickness in the position correction mode or not, and if a determination is made that there is an abnormality, terminating the position correction process corresponding to this abnormality determination.

7. A method of spot welding according to claim 5, further comprising determining, with an abnormality determination section of the processing section, whether there is an abnormality in the position correction process pertaining to detecting the workpiece position or the workpiece thickness in the position correction mode or not, and if a determination is made that there is an abnormality, retrying the position correction process corresponding to this abnormality determination.

8. A method of spot welding according to claim 5, further comprising correcting, using a correction section of the processing section, a spot welding position that is preset in the working program based on the workpiece position computed by the computation section or the workpiece position and the workpiece thickness computed by the computation section.

9. A method of spot welding according to claim 5, further comprising utilizing a program setting change section to change setting information of the working program, wherein the program setting change section that is utilized has a setting change section for changing the workpiece thickness recorded as the setting information into the workpiece thickness computed by the computation section, wherein the method further includes changing the workpiece thickness recorded into the workpiece thickness computed by the computation section with the program setting change section.

10. A method of spot welding according to claim 1, further comprising computing, with the computation section, a position correction amount of the workpiece position preset in the working program based on the workpiece position computed by the computation section, and storing, using a storage section of the spot welding system, this position correction amount.

11. A method of spot welding according to claim 1, further comprising setting, using a setting section of the obtained spot welding system, whether the position correction process in the position correction mode is performed or not for every workpiece position to be spot-welded.

12. A method of spot welding according to claim 1, further comprising setting, using the abutment determination section, a predetermined limit of the torque of the servo motor.

* * * * *